(12) United States Patent
Avery

(10) Patent No.: US 8,191,400 B2
(45) Date of Patent: Jun. 5, 2012

(54) METHOD AND APPARATUS FOR SUPPORTING ACCELEROMETER BASED CONTROLS IN A MOBILE ENVIRONMENT

(75) Inventor: John Avery, Newnan, GA (US)

(73) Assignee: Panasonic Automotive Systems Company of America, Peachtree City, GA (US)

( * ) Notice: Subject to any disclaimer, the term of this patent is extended or adjusted under 35 U.S.C. 154(b) by 351 days.

(21) Appl. No.: 12/586,911

(22) Filed: Sep. 29, 2009

(65) Prior Publication Data

US 2011/0072880 A1   Mar. 31, 2011

(51) Int. Cl.
*G01P 21/00* (2006.01)
(52) U.S. Cl. ........................................... 73/1.38
(58) Field of Classification Search .................. None
See application file for complete search history.

(56) References Cited

U.S. PATENT DOCUMENTS

| | | | |
|---|---|---|---|
| 6,955,603 B2 | 10/2005 | Jeffway, Jr. et al. | |
| 7,688,190 B2 * | 3/2010 | Lienenkamp | 340/438 |
| 7,702,608 B1 * | 4/2010 | Bererton et al. | 706/46 |
| 2006/0009289 A1 | 1/2006 | McCarten et al. | |
| 2007/0132714 A1 | 6/2007 | Nilsson | |
| 2007/0149284 A1 | 6/2007 | Plavetich et al. | |
| 2008/0015031 A1 | 1/2008 | Koizumi et al. | |
| 2008/0105050 A1 | 5/2008 | Kraetz | |
| 2008/0225000 A1 | 9/2008 | Bellwood et al. | |

* cited by examiner

*Primary Examiner* — Robert R Raevis
(74) *Attorney, Agent, or Firm* — Laurence S. Roach

(57) ABSTRACT

A method of processing signals from an accelerometer/gyroscopic-based input device includes providing the input device within a vehicle. An accelerometer/gyroscopic-based second device is also provided within the vehicle. The input device is manually actuated while the vehicle is in motion. First signals are transmitted from the input device in response to the manually actuating step. Second signals are transmitted from the second device in response to the motion of the vehicle. The first signals are adjusted dependent upon the second signals.

20 Claims, 5 Drawing Sheets

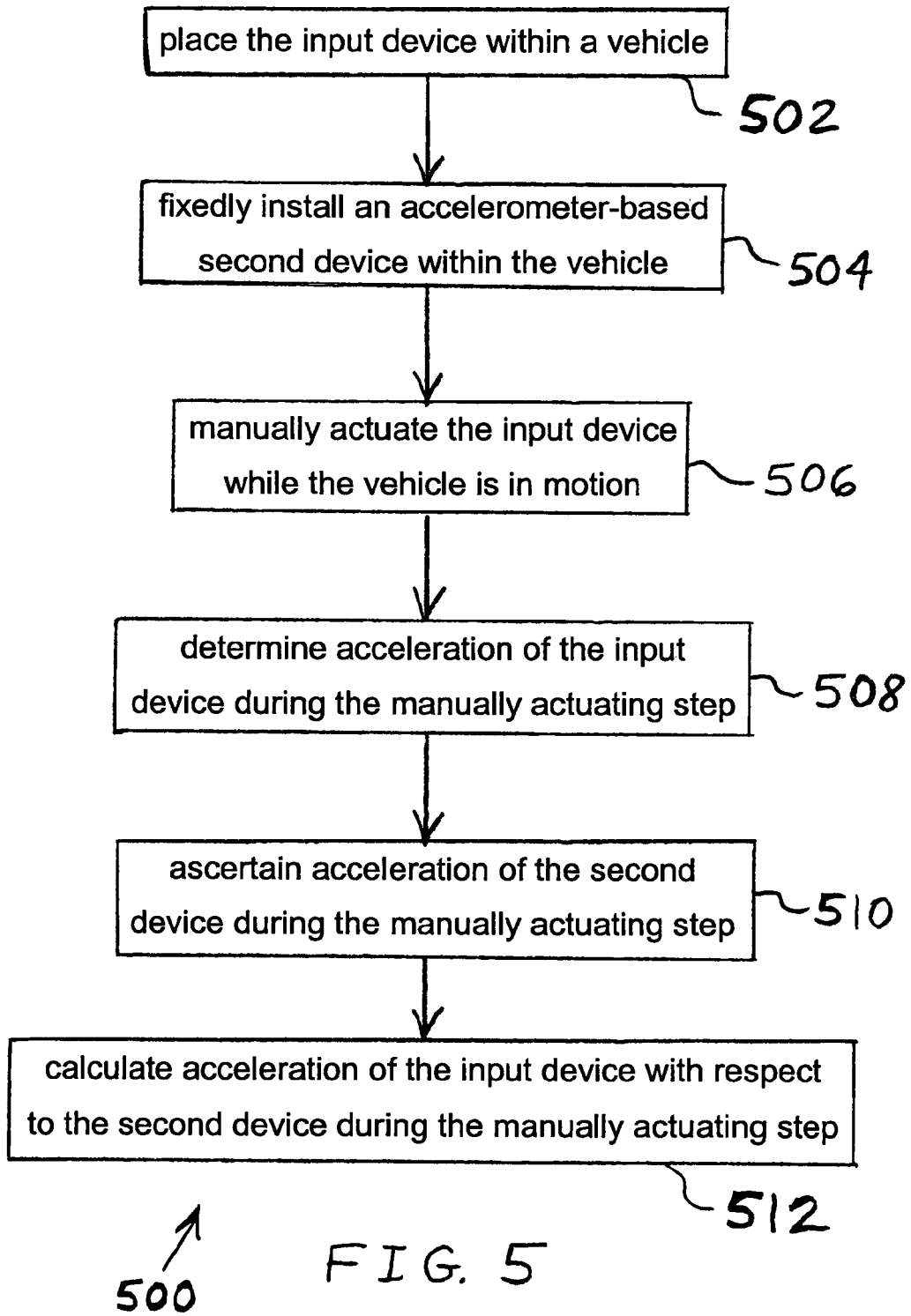

METHOD AND APPARATUS FOR SUPPORTING ACCELEROMETER BASED CONTROLS IN A MOBILE ENVIRONMENT

BACKGROUND OF THE INVENTION

1. Field of the Invention

The present invention relates to methods and apparatuses for operating accelerometer based controls, and, more particularly, to methods and apparatuses for operating accelerometer based controls that are being carried in a moving vehicle.

2. Description of the Related Art

Many console game systems today, as well as other electronic devices, make use of accelerometer and/or gyroscopic based input devices to achieve a more natural and immersive experience. This trend is expected to continue and expand into other types of devices, such as media systems, automotive entertainment systems, portable game systems, etc.

These controllers are currently ineffective when used in a mobile environment, such as an automobile, train, plane, ship, etc., due to the motion of the vehicle being interpreted as user input. Accelerometer-based devices may also produce erroneous output signals due to bouncing, swaying and tilting of the vehicle during its acceleration or deceleration. It may be possible for the output of an accelerometer-based device to be compensated for the acceleration and deceleration of the vehicle based on the output signal of the vehicle's speedometer. However, the output signal of the vehicle's speedometer is not indicative of, and thus cannot compensate for, lifting of the front end of the vehicle and dropping of the rear end of the vehicle during acceleration (or vice versa during deceleration). More generally, the output signal of a vehicle speedometer cannot be used to compensate the output of an on-board accelerometer for the roll, pitch and yaw of the vehicle. Each of the roll, pitch and yaw of the vehicle may affect the output of an on-board accelerometer, which may result in both random and systematic errors. For the above reasons, known in-vehicle accelerometer-based devices may produce output signals that are subject to error.

Accordingly, what is neither anticipated nor obvious in view of the prior art is an apparatus and method for automatically compensating the output signals of a motion detecting input device for the motion of a vehicle that carries the input device.

SUMMARY OF THE INVENTION

The present invention provides an arrangement of a set of accelerometers and gyroscopic devices in a fixed location within the vehicle, making it possible to obtain a reference signal which can then be subtracted from the input device signal. This adjusted signal can then be used to determine the actual motion of the input device within the frame of reference of the vehicle. Thus, the accelerometer based input device can again be used even while inside a moving vehicle.

The invention comprises, in one form thereof, a method of processing signals from an accelerometer/gyroscopic-based input device, including providing the input device within a vehicle. An accelerometer/gyroscopic-based second device is also provided within the vehicle. The input device is manually actuated while the vehicle is in motion. First signals are transmitted from the input device in response to the manually actuating step. Second signals are transmitted from the second device in response to the motion of the vehicle. The first signals are adjusted dependent upon the second signals.

The invention comprises, in another form thereof, an arrangement for receiving manual inputs. The arrangement includes an accelerometer/gyroscopic-based input device disposed within a vehicle. An accelerometer/gyroscopic-based second device is fixedly attached to the vehicle. A processor is in communication with each of the input device and the second device. The processor receives first signals from the input device in response to the input device being manually actuated during a time period in which the vehicle is in motion. The processor also receives second signals from the second device during the time period. The processor then calculates an acceleration of the input device with respect to the second device. The acceleration takes place during the time period. The calculating is dependent upon the first signals and the second signals.

The invention comprises, in yet another form thereof, a method of calibrating an accelerometer-based input device, including placing the input device within a vehicle. An accelerometer/gyroscopic-based second device is fixedly installed within the vehicle. The input device is manually actuated while the vehicle is in motion. Acceleration and orientation of the input device during the manually actuating step is determined. Acceleration and orientation of the second device during the manually actuating step is also determined. Acceleration and orientation of the input device with respect to the second device during the manually actuating step is calculated.

An advantage of the present invention is that it enables an accelerometer/gyroscopic based input device to be used effectively inside a moving vehicle.

Another advantage of the present invention is that it may incorporate a standard accelerometer/gyroscopic-based input device.

Yet another advantage is that the invention may be unnoticeable by a user of the accelerometer/gyroscopic-based input device. Thus, the user of the invention may not be distracted by the operation of the invention.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 3c is a plot of a difference signal produced by subtracting the signal of FIG. 3b from the signal of FIG. 3a;

FIG. 5 is a flow chart of one embodiment of a method of the present invention for calibrating an accelerometer/gyroscopic-based input device.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
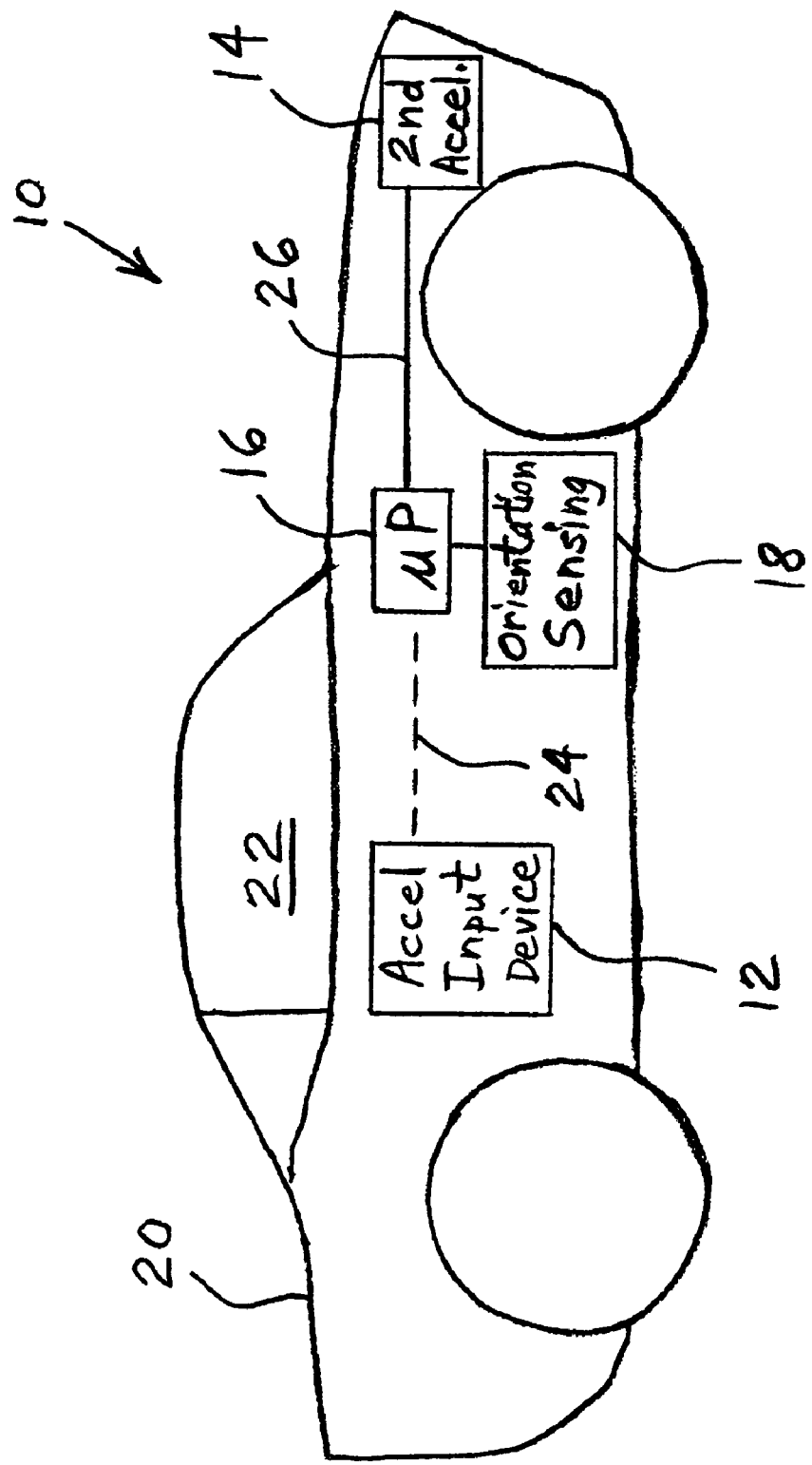
FIG. 1 is a block diagram of an accelerometer/gyroscopic-based control arrangement suitable for use in a mobile environment, according to one embodiment of the present invention.

Referring now to the drawings, and particularly to FIG. 1, there is shown one embodiment of an accelerometer/gyroscopic-based control arrangement 10 of the present invention suitable for use in a mobile environment. Arrangement 10 includes a user interface in the form of an accelerometer/gyroscopic-based input device 12, a second accelerometer/gyroscopic-based device 14, a processor 16 and an orientation-sensing means 18, with each of the above elements being disposed within a vehicle 20.

Accelerometer/gyroscopic-based input device 12 may be a wireless device that is carried by the user into a passenger compartment 22 of vehicle 20. Device 12 has at least one accelerometer/gyroscopic device for sensing and measuring the acceleration and deceleration with which the user manually swings, pulls or pushes device 12 through the air. Input device 12 may include a second accelerometer/gyroscopic device oriented at a right angle to the first device to measure acceleration in a second dimension such that acceleration within a plane may be determined. Further, input device 12 may include a third accelerometer/gyroscopic device oriented at a right angle to each of the first and second devices to measure acceleration in a third dimension such that acceleration within an area of space may be determined. Of course the scope of the invention may further encompass any number of accelerometers/gyroscopic devices greater than three. As the term is used herein, and for the sake of avoiding needless repetition, it is to be understood that "acceleration" may mean either true acceleration, wherein speed is increasing, or deceleration, wherein speed is decreasing.

The measured readings from input device 12 may be wirelessly transmitted from input device 12 to processor 16, as indicated at 24. Processor 16 may include a wireless receiver (not shown) for receiving the measured readings from input device 12. The wireless transmissions from input device 12 to processor 16 may, for example, utilize Bluetooth® technology as marketed by Bluetooth Sig, Inc. of Bellevue, Wash., USA.

The measured readings received by processor 16 may be used, for example, as user inputs to a video game (not shown) which is played by passengers within passenger compartment 22. The game may be portable such that the game's video screen may be carried in and out of passenger compartment 22 and rested on the user's lap, for example, during play. Alternatively, the video screen used in the game may be more permanently installed in and attached to vehicle 20. For example, the video screen(s) may be integrated into a front seat headrest(s), suspended from a ceiling of passenger compartment 22, or installed in the vehicle's dashboard.

The game may be played, and the user inputs utilized, either while vehicle 20 is stationary or while vehicle 20 is traveling. Moreover, any number of input devices 12 may be simultaneously utilized to provide game inputs within a single passenger compartment 22. It may even be possible, via wireless technology, for passengers in different vehicles, each having all the components of vehicle 20, to play against or with each other in the same game.

In one embodiment, device 12 is similar in size, shape and operation to the controller of the Wii® product marketed by Nintendo of America Inc. of Redmond, Wash., USA. However, it is to be understood that this is just one example, and device 12 may be any form of handheld controller that utilized the outputs of at least one accelerometer/gyroscopic device. The accelerometer(s) included in accelerometer device 12 may, as a specific example, is in the form of a model no. SCM5B solid state accelerometer input module marketed by Dataforth Corporation, having offices in Tucson, Ariz., USA.

Second device 14 may provide the same readings as input device 12, but with fixed position and orientation within the vehicle. Second device 14 may include the same number of accelerometers and gyroscopic devices as input device 12. Further, the detectors of second device 14 may be oriented at right angles to each other, just as those of input device 12 are.

The accelerometer(s) of second accelerometer-based device 14 may be disposed within, and fixedly attached to, a housing (not shown), which is, in turn, fixedly attached to the body or frame of vehicle 20. More generally, second device 14 may be attached to any portion of vehicle 20 that is subjected to the same motions and forces that passenger compartment 22 is subjected to. For instance, it may not be desirable for second device 14 to be attached to the wheels of vehicle 20 if the wheels are mechanically decoupled from passenger compartment 22 by a suspension system of vehicle 20.

Processor 16 may be in the form of any standard microprocessor that is capable of running the application that input device 12 provides inputs to (e.g., a video game), and that is capable of processing the inputs from input device 12 in real time for use in the application. Processor 16 may be hardwired to second device 14 via a conductor 26.

Orientation-sensing means 18 may be provided within passenger compartment 22 of vehicle 20 to monitor the orientation of input device 12 in three axes while the user is manually actuating input device 12. In the particular embodiment illustrated in FIG. 2, orientation-sensing means 18 includes two infra-red emitters 28a, 28b, which may be fixedly attached to, and/or installed in, a dashboard of vehicle 20. Emitters 28a, 28b may be energized by and controlled by processor 16 via respective conductors 30a, 30b. Emitters 28a, 28b may be oriented on the vehicle's dashboard such that they emit infra-red energy in parallel directions, as indicated by arrows 32a, 32b, into passenger compartment 22. The emitted infra-red energy may carry digital codes that identify which of the two infra-red emitters 28a, 28b that the energy was transmitted from. Input device 12 may include a camera 34 for receiving and sensing the relative strengths of the infra-red energy from emitters 28a, 28b. The orientation of input device 12 relative to three axes may be determined based upon the strengths of the two received infra-red signals via triangulation techniques.

During installation, the orientation of second device 14 in three axes may be sensed and stored in a memory device (not shown) of processor 16. Likewise, the orientation of emitters 28a, 28b in three axes may be sensed and stored in a memory device (not shown) of processor 16. The orientations of second device 14 and emitters 28a, 28b may be measured and recorded relative to a common reference orientation. Alternatively, the orientation of one of second device 14 and emitters 28a, 28b may be measured and recorded relative to the orientation of the other of second device 14 and emitters 28a, 28b. To account for differences between the orientations of the individual emitters 28a, 28b, in one embodiment, the orientations of two of the group of three components including second device 14, emitter 28a and emitter 28b may be measured and recorded relative to the orientation of the remaining one of the group of three components.

Figure 2:
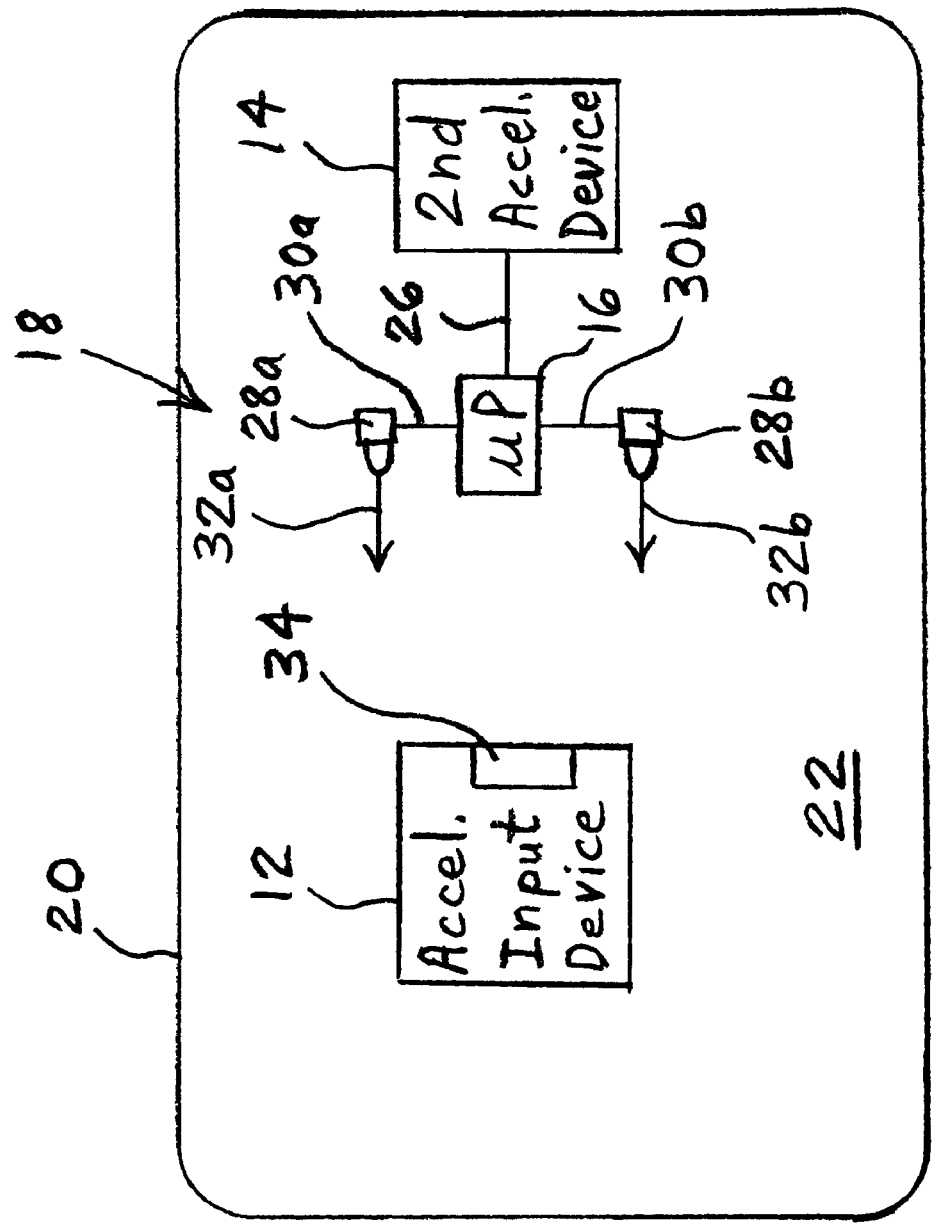
FIG. 2 is a block diagram of the accelerometer/gyroscopic-based control arrangement of FIG. 1, including a specific embodiment of means for determining an orientation of an accelerometer/gyroscopic-based input device.

In the particular embodiment shown in FIG. 2, the process of determining the orientations of emitters 28a, 28b upon installation may include holding input device 12 in a fixed position with a lens of camera 34 focused in a direction that is midway between emitters 28a, 28b. Emitters 28a, 28b may then be energized by processor 16 to emit infra-red energy with their identity digitally embedded in the infra-red energy signal. With both input device 12 and second device 14 being held fixed within vehicle 20, vehicle 20 may be driven a short distance in order to produce and record accelerometer readings from input device 12 and second device 14. This initial fixed orientation of input device 12 may be considered a baseline orientation. Further, the difference between future accelerometer readings from input device 12 and second device 14 may be considered relative to a baseline difference in the accelerometer readings when input device 12 is in the initial fixed position.

In one embodiment, the installation procedure may further include rotating input device 12 within one plane, or within each of two perpendicular planes, and continuing to sense the received signal strength from emitters 28a, 28b throughout the rotation. This received signal strength data at various orientations may be stored in memory in order to match it up with received signal strength data collected during use, and to thereby determine the orientation of input device 12 based thereon during use.

During operation, the user may play a video game or engage in some other application that may receive manual inputs from the user via input device 12. Acceleration and orientation along the three axes may be monitored as the user manually swings, pushes and/or pulls input device 12 through the air. The accelerometer/gyroscopic readings may be compensated for based on the changing orientation of input device 12 as device 12 is actuated, as measured by orientation sensing means 18.

If the user actuates input device 12 while vehicle 20 is moving, then the accelerometers of input device 12 will sense not only the user's actuation of device 12, but also the movement and acceleration of vehicle 20. However, it is generally desirable for the application to receive only the user's intended inputs without the data corruption which results from the acceleration of the environment, i.e., the acceleration of vehicle 20. Thus, according to the invention, the accelerometer and gyroscopic readings from second device 14 may be subtracted from the orientation-adjusted inputs provided by input device 12 to produce inputs for the application that are unaffected by the acceleration of vehicle 20.

Figure 3A:
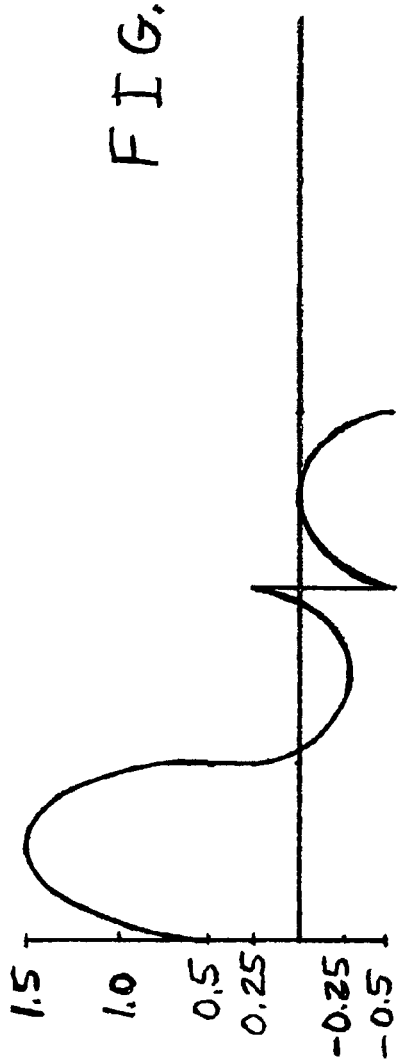
FIG. 3a is an exemplary plot of the output of the accelerometer/gyroscopic-based input device of FIG. 2.
Figure 3B:
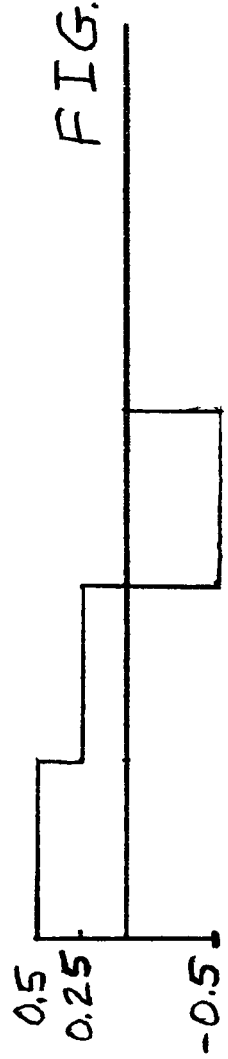
FIG. 3b is an exemplary plot of the output of the second accelerometer/gyroscopic-based device of FIG. 2.
Figure 3C:
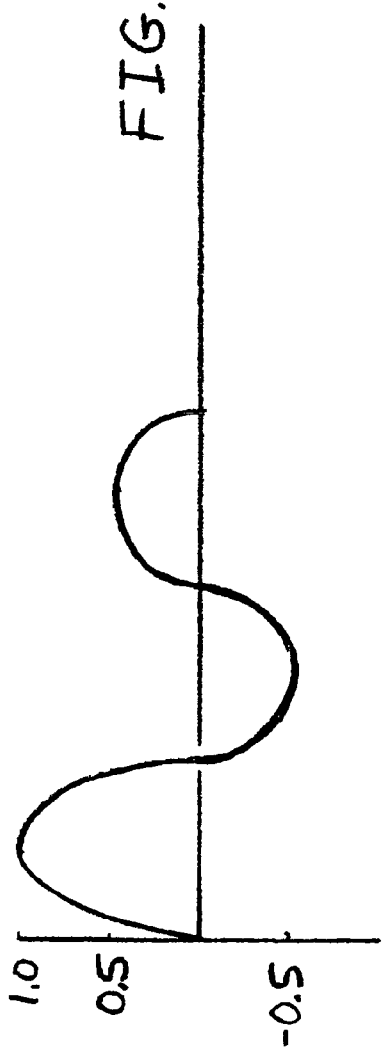

The above-described input compensation procedure is illustrated in FIGS. 3a-c for one axis. More particularly, FIG. 3a is a plot of the orientation-adjusted input provided by one accelerometer of input device 12. That is, the raw output of the accelerometer of input device 12 may be adjusted, based on the changing orientations of device 12 as determined by orientation sensing means 18, to reflect the acceleration of device 12 along a single axis. This orientation-adjusted input plotted in FIG. 3a may be matched to the output (FIG. 3b) of one of the accelerometers of second device 14 that reflects vehicle acceleration along the same axis that is reflected by the data of FIG. 3a.

For ease of illustration, the output of one of the accelerometers of second device 14, as plotted in FIG. 3b, is shown as abruptly changing from one constant value to another in a stair-step fashion. However, it is to be understood that the actual output of the device 14 accelerometer is likely to be more smoothly varying, as is the orientation-adjusted input plotted in FIG. 3a.

According to the invention, the signal of FIG. 3b may be subtracted from the signal of FIG. 3a to arrive at a true input signal as produced by the user's motion, and without effects of the acceleration or orientation of vehicle 20. FIG. 3c is a plot of an input signal adjusted for vehicle acceleration, and is derived by subtracting the signal of FIG. 3b from the signal of FIG. 3a. The vehicle acceleration-adjusted input signal of FIG. 3c may be utilized as a user-provided input for an application such as a video game. Advantageously, this vehicle adjusted input signal of FIG. 3c may be independent of, and unaffected by, the motion or acceleration or orientation of vehicle 20 that occurs while the user is actuating input device 12.

Figure 4:
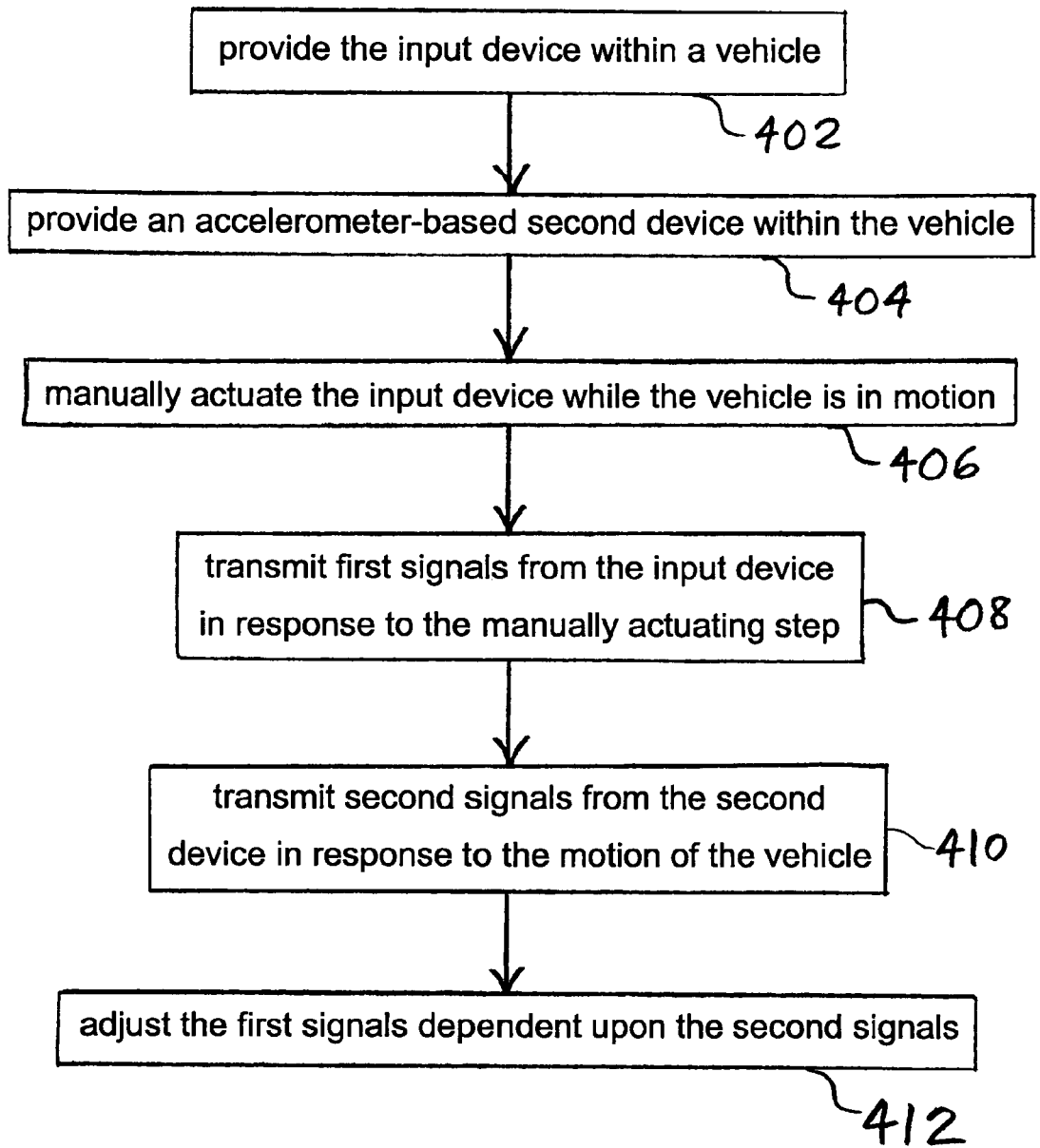
FIG. 4 is a flow chart of one embodiment of a method of the present invention for processing signals from an accelerometer/gyroscopic-based input device.

One embodiment of a method 400 for processing signals from an accelerometer/gyroscopic-based input device is illustrated in FIG. 4. In a first step 402, the input device is provided within a vehicle. For example, a user may carry a portable accelerometer/gyroscopic-based input device 12 into passenger compartment 22. Alternatively, accelerometer/gyroscopic-based input device 12 may be permanently or semi-permanently tethered to passenger compartment 22.

In a next step 404, an accelerometer-based second device is provided within the vehicle. More particularly, a second accelerometer-based device 14 may be fixedly attached to some portion of vehicle 20 that is subject to the same motions and accelerations as is passenger compartment 22.

Next, in step 406, the input device is manually actuated while the vehicle is in motion. That is, while playing a video game or engaging some other type of application, the user may swing, push and/or pull input device 12 through the air in passenger compartment 22 while vehicle 20 is being driven.

In step 408, first signals are transmitted from the input device in response to the manually actuating step 406. For example, each of the accelerometers in input device 12 (although it is possible that input device 12 includes only a single accelerometer) may provide a respective electronic signal indicative of the acceleration experienced by input device 12 in a respective direction.

In a next step 410, second signals are transmitted from the second device in response to the motion of the vehicle. For example, each of the accelerometers in second device 14 (although it is possible that second device 14 includes only a single accelerometer) may provide a respective electronic signal indicative of the acceleration experienced by second device 14 in a respective direction.

In a final step 412, the first signals are adjusted dependent upon the second signals. In one embodiment, the signals produced by the accelerometers/gyroscopic devices of input device 12 may be adjusted to compensate for the changing orientation of input device 12 as device 12 is actuated by the user, and to match up the direction in which the accelerometer is measuring acceleration with the direction in which a corresponding accelerometer in second device 14 is measuring acceleration. These orientation-compensated signals from input device 12 may be adjusted by subtracting from them the signal produced by the corresponding accelerometer in second device 14. These adjusted signals may be unaffected by the motion and acceleration of the vehicle, and thus may be truer representations of the input signals that the user intended to provide through his actuation of device 12.

One embodiment of a method 500 for calibrating an accelerometer-based input device is illustrated in FIG. 5. In a first step 502, the input device is placed with a vehicle. For example, a user may carry a portable accelerometer/gyroscopic-based input device 12 into passenger compartment 22.

Alternatively, accelerometer/gyroscopic-based input device 12 may be permanently or semi-permanently tethered to passenger compartment 22.

In a next step 504, an accelerometer/gyroscopic-based second device is fixedly installed within the vehicle. More particularly, a second accelerometer/gyroscopic-based device 14 may be rigidly attached to some portion of vehicle 20 that is subject to the same motions and accelerations as is passenger compartment 22.

Next, in step 506, the input device is manually actuated while the vehicle is in motion. That is, while playing a video game or engaging some other type of application, the user may swing, push and/or pull input device 12 through the air in passenger compartment 22 while vehicle 20 is being driven.

In step 508, acceleration of the input device is determined during the manually actuating step. More particularly, first signals are transmitted from the input device in response to the manually actuating step 506. For example, each of the accelerometers in input device 12 (although it is possible that input device 12 includes only a single accelerometer) may provide a respective electronic signal indicative of the acceleration experienced by input device 12 in a respective direction. Processor 16 may process the first signals from input device 12 and determine therefrom the raw acceleration of input device 12 due to both the manual actuation by the user and the acceleration of vehicle 20.

In a next step 510, acceleration of the second device during the manually actuating step is ascertained. More particularly, second signals are transmitted from the second device in response to the motion of the vehicle. For example, each of the accelerometers in second device 14 (although it is possible that second device 14 includes only a single accelerometer) may provide a respective electronic signal indicative of the acceleration experienced by second device 14 in a respective direction. Processor 16 may process the second signals from second device 14 and determine therefrom the acceleration of second device 14 due to the acceleration of vehicle 20.

In a final step 512, acceleration of the input device is calculated with respect to the second device during the manually actuating step. More particularly, the first signals are adjusted dependent upon the second signals. In one embodiment, the signals produced by the accelerometers of input device 12 may be adjusted to compensate for the changing orientation of input device 12 as device 12 is actuated by the user, and to match up the direction in which the accelerometer is measuring acceleration with the direction in which a corresponding accelerometer in second device 14 is measuring acceleration. These orientation-compensated signals from input device 12 may be adjusted by subtracting from them the signal produced by the corresponding accelerometer in second device 14. The calculated adjusted signals may be unaffected by the motion and acceleration of the vehicle, and thus may be truer representations of the acceleration that the user intended to apply to input device 12 through his actuation of device 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of processing signals from an accelerometer-based input device, comprising the steps of:
    providing the input device within a vehicle;
    providing an accelerometer-based second device within the vehicle;
    manually actuating the input device while the vehicle is in motion;
    transmitting first signals from the input device in response to the manually actuating step;
    transmitting second signals from the second device in response to the motion of the vehicle;
    adjusting the first signals dependent upon the second signals; and
    calculating an orientation of the input device, the adjusting step being dependent upon the calculated orientation, the calculating step including:
        providing two infra-red emitters;
        emitting infra-red energy from the emitters into a passenger compartment of the vehicle;
        providing an infra-red sensor associated with the input device; and
        using the infra-red sensor to sense the emitted infra-red energy.

2. The method of claim 1 wherein the adjusting step includes subtracting the second signals from the first signals.

3. The method of claim 1 wherein each of the first signals and the second signals are indicative of acceleration in three axes.

4. The method of claim 1 wherein the input device comprises a user interface for an electronic game.

5. The method of claim 1 wherein the input device is provided within a passenger compartment of the vehicle.

6. The method of claim 1 comprising the further step of fixedly attaching the second device to the vehicle.

7. An arrangement for receiving manual inputs, the arrangement comprising:
    a gyroscopic-based input device disposed within a vehicle;
    a gyroscopic-based second device fixedly attached to the vehicle;
    a processor in communication with each of the input device and the second device, the processor being configured to:
        receive first signals from the input device in response to the input device being manually actuated during a time period in which the vehicle is in motion;
        receive second signals from the second device during the time period; and
        calculate an acceleration of the input device with respect to the second device, the acceleration being during the time period, the calculating being dependent upon the first signals and the second signals; and
    means for determining an orientation of the input device, the calculating being dependent upon an output of the determining means, the determining means comprising:
        two infra-red emitters configured to emit infra-red energy into a passenger compartment of the vehicle; and
        an infra-red sensor associated with the input device and configured to sense the emitted infra-red energy.

8. The arrangement of claim 7 wherein the processor is configured to calculate an acceleration of the input device in three axes with respect to the second device.

9. The arrangement of claim 7 wherein the processor is configured to calculate an acceleration of the input device based on differences between the second signals and the first signals.

10. The arrangement of claim 7 wherein the input device comprises a user interface for an electronic game.

11. The arrangement of claim 7 wherein the input device is disposed within a passenger compartment of the vehicle.

12. A method of calibrating an accelerometer-based or gyroscopic-based input device, comprising the steps of:
placing the input device within a vehicle;
fixedly installing an accelerometer-based or gyroscopic-based second device within the vehicle;
manually actuating the input device while the vehicle is in motion;
determining acceleration and orientation of the input device during the manually actuating step, the step of determining the orientation including:
providing two infra-red emitters;
emitting infra-red energy from the emitters into a passenger compartment of the vehicle;
providing an infra-red sensor associated with the input device; and
using the infra-red sensor to sense the emitted infra-red energy;
ascertaining acceleration and orientation of the second device during the manually actuating step; and
calculating acceleration of the input device with respect to the second device during the manually actuating step.

13. The method of claim 12 wherein the determining step comprises determining acceleration of the input device in three axes during the manually actuating step.

14. The method of claim 13 wherein the ascertaining step comprises ascertaining acceleration of the second device in the three axes during the manually actuating step.

15. The method of claim 12 wherein the calculating step is dependent on the acceleration of the input device and on the acceleration of the second device.

16. The method of claim 12 wherein the calculating step includes ascertaining a difference between first signals transmitted by the input device and second signals transmitted by the second device.

17. The method of claim 12 comprising the further step of sensing orientations of the input device during the manually actuating step, the determining step being dependent upon the sensed orientations.

18. The method of claim 12 wherein the input device is accelerometer-based.

19. The method of claim 18 wherein the second device is accelerometer-based.

20. The method of claim 12 wherein the input device is gyroscopic-based.

* * * * *